Figure 1:
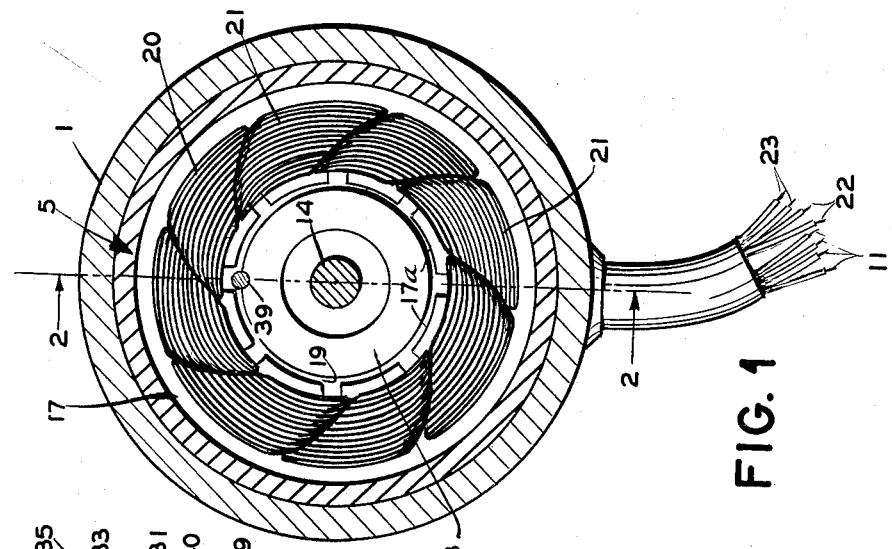

March 2, 1954

I. E. GOLDBERG 2,671,180

INDUCTION GENERATOR

Filed Aug. 24, 1951

INVENTOR.
ISRAEL E. GOLDBERG
BY
*[signature]*
ATTORNEY

Patented Mar. 2, 1954

2,671,180

UNITED STATES PATENT OFFICE 2,671,180

INDUCTION GENERATOR

Israel E. Goldberg, Fort Lee, N. J., assignor to Bendix Aviation Corporation, Teterboro, N. J., a corporation of Delaware Application August 24, 1951, Serial No. 243,561

7 Claims. (Cl. 310—171)

The invention relates to induction generators and more particularly to rate generators of the kind used in servo systems and computers.

A servo system using a rate generator is shown and described in Riggs Patent No. 2,115,086 issued April 26, 1938. The rate generator is driven by a servomotor and provides a voltage corresponding to the speed of the motor which is combined with a signal from a controller and applied to an amplifier to control the motor. The voltage from the rate generator avoids hunting of the motor.

Rate generators also are used as tachometers or speed indicating devices in computer systems where the derived result is a function of the speed and/or acceleration of the motor driving the generator.

Rate generators of the kind described usually provide a residual voltage when the generator is at rest because of asymmetrical leakage flux, such as end-turn leakage flux and fringe flux at the end of the air gap between the rotor and stator. In a servo system, this residual voltage may drive the servomotor from null position and cause saturation in a servo amplifier so that the amplifier becomes insensitive to signals from the controller. In a computer system, the residual voltage provides a speed signal when the motor is at rest. Obviously such residual voltages are undesirable.

The main object of the present invention is to substantially eliminate the residual voltage when the rate generator is at rest.

Another object is to modify the leakage flux pattern, such as end-turn leakage flux and fringe flux at the end of the air gap, to substantially eliminate residual voltage of the rate generator.

Another object is to provide an induction generator having a magnetic circuit which can be adjusted to compensate for end-turn leakage flux and fringe flux to provide a flux pattern which substantially eliminates residual voltage when the generator is at rest.

The invention compensates a generator having a stator including a core with windings thereon, a rotor rotatable relative to the stator and closely associated with the core, and an element of magnetically permeable material positioned adjacent to the stator and arranged to modify the leakage flux, such as the leakage flux from the end-turns of the windings and the fringe flux at the end of the air gap between the core and rotor, to substantially eliminate residual voltage induced in the windings when the rotor is at rest.

The foregoing and other objects and advantages of the invention will appear more fully hereinafter from a consideration of the detailed description which follows, taken together with the accompanying drawing wherein one embodiment of the invention is illustrated. It is to be expressly understood, however, that the drawing is for the purposes of illustration and description only, and is not to be construed as defining the limits of the invention.

Figure 2:
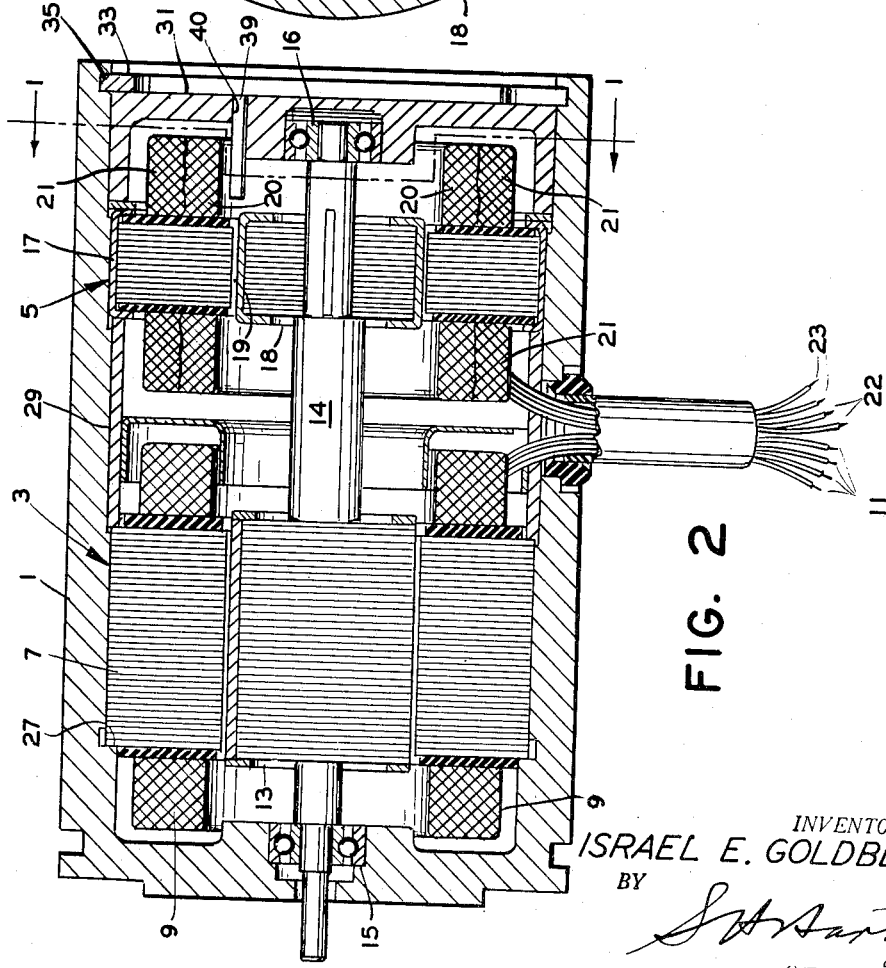

In the drawing, Figure 1 is a transverse vertical section taken approximately on the line 1—1 of Figure 2 of a generator unit constructed according to the invention, and Figure 2 is a longitudinal vertical section taken approximately on the line 2—2 of Figure 1 through the axis of the unit.

Referring now to the drawing for a more detailed description of the generator unit of the present invention, the unit comprises a housing 1 enclosing a motor 3 drivably connected to an induction generator 5. The motor comprises a core 7 of laminated material having windings 9 surrounding the core and having terminals 11 adapted for connection to the output of an amplifier or other suitable power source for energizing the windings. A rotor 13 is fixed to a shaft 14 rotatably supported in bearings 15, 16 in housing 1. While an electric motor is shown driving the generator, it should be understood that any other suitable driving means may be used.

Generator 5 is positioned in housing 1 adjacent motor 3 and includes a stator having a core 17 of laminated material with any desired number of poles 17a. A rotor 18 of any suitable kind is fixed to shaft 14 and rotates within the core and is spaced from the poles by an air gap 19. Windings 20, 21 are wound on the core and are provided with terminals 22, 23, respectively. Terminals 22 of windings 20 are adapted to be connected to an alternating current source (not shown) to energize the windings and terminals 23 of windings 21 are adapted to be connected in a control circuit to provide a voltage corresponding to the speed of rotation of rotor 13 of motor 3.

Housing 1 has an annular shoulder 27 abutting core 7 of motor 3 and a sleeve 29 is received within the housing and one end of the sleeve engages the other side of core 7. The other end of sleeve 29 engages core 17 of generator 5 and a cap 31 mounts bearing 16 and closes the end of housing 1 and abuts the other side of core 17. An expansible ring 33 is received within an annular groove 35 in housing 1 and frictionally engages cap 31 to maintain assembly of the motor and generator in the housing.

The arrangement described is known in the art and leakage flux from the end-turns of excited windings 20 and fringe flux from the ends of air gap 19 induces a residual voltage in windings 21 when rotor 18 is at rest with the disadvantages mentioned above. To substantially eliminate the residual voltage induced in windings 21 when the rotor is at rest, the flux pattern is modified by assembling to cap 31 a rod-like element 39 of magnetically permeable material extending inwardly of housing 1 close to and within windings 20, 21. One end of rod 39 is fixed in an aperture 40 in cap 31 and the other end is positioned adjacent to core 17 near the end of the air gap. Element 39 is adjusted relative to core 17 and windings 20, 21 when rotor 18 is at rest by rotating cap 31, before ring 33 is installed in groove 35, to reduce the coupling of the windings until the residual voltage induced in windings 21 is a minimum. Ring 33 then is installed in groove 35 and frictionally engages cap 31 and holds it against rotation relative to housing 1.

The arrangement described substantially eliminates residual voltage of the generator when the rotor is at rest so that the generator is especially adapted for use in a computer of the kind described and in a servo system where the servo motor must be accurately returned to zero position.

Although only one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

I claim:
1. A generator of the kind described having a stator with excited and output windings thereon, a rotor rotatable relative to said stator, and an element of magnetically permeable material closely associated with said stator and fixed relative thereto and positioned to reduce the coupling of said windings by modifying leakage flux from said excited winding to substantially eliminate residual voltages induced in said output winding when said rotor is at rest.

2. A generator of the kind described having a relatively rotatable rotor and stator, said stator having a core with a pair of windings thereon, one of said windings being adapted for energization by an alternating current source for inducing a voltage in said other winding upon relative rotation of said rotor and stator, an element of magnetically permeable material closely associated with said stator and fixed relative thereto and positioned to reduce the coupling of said windings by modifying leakage flux from said energized winding to substantially eliminate residual voltages induced in said other winding when said rotor is at rest relative to said stator.

3. A generator of the kind described including a stator having a core with a plurality of poles and windings thereon, a rotor rotatable relative to said stator and closely associated with said poles, one of said windings being adapted for energization by an alternating current source for inducing a voltage in said other winding upon relative rotation of said rotor and stator, and an element of magnetically permeable material positioned adjacent to said stator and arranged to reduce the coupling of said windings by modifying the leakage flux from the end-turns of said excited winding and the fringe flux at the end of the air gap between the poles and rotor to substantially eliminate residual voltages induced in said other winding when said rotor is at rest.

4. A generator of the kind described having a stator with a core and windings thereon, a rotor rotatable relative to said stator and closely associated with said core and forming an air gap therebetween, one of said windings being adapted for energization by an alternating current source for inducing a voltage in said other winding upon relative rotation of said rotor and stator, a rod-like element of magnetically permeable material extending close to said windings and having one end positioned adjacent the end of said air gap, said element being positioned and arranged to reduce the coupling of said windings by modifying the leakage flux from the end-turns of said excited winding and fringe flux at the end of the air gap to substantially eliminate residual voltages induced in said other winding when said rotor is at rest.

5. A generator of the kind described having a housing with a cap adjustable angularly relative thereto and means for maintaining said cap assembled to said housing and fixed relative thereto after adjustment, a stator mounted within said housing and including a core with windings thereon, a rotor rotatable relative to said stator and closely associated with said core, one of said windings being adapted for energization by an alternating current source for inducing a voltage in said other winding upon relative rotation of said rotor and stator, and a rod-like element of magnetically permeable material mounted on said cap and extending inwardly of said housing close to said windings and having one end positioned adjacent to said core, said cap being adjusted angularly so that said element is in a position relative to said windings and said core to reduce the coupling of said windings by modifying the leakage flux from said excited winding to substantially eliminate residual voltages induced in said other winding when said rotor is at rest.

6. A generator of the kind described having a housing with a cap adjustable angularly relative thereto and means for maintaining said cap assembled to said housing and fixed relative thereto after adjustment, a stator mounted within said housing and including a core with windings thereon, a rotor rotatable relative to said stator and closely associated with said core and spaced therefrom by an air gap, one of said windings being adapted for energization by an alternating current source for inducing a voltage in said other winding upon relative rotation of said rotor and stator, and a rod-like element of magnetically permeable material mounted on said cap and extending inwardly of said housing close to said windings and having one end positioned adjacent the end of said air gap, said cap being adjusted angularly so that said element is in a position relative to said windings and said core to reduce the coupling of said winding by modifying the leakage flux from the end-turns of said excited winding and the fringe flux at the end of said air gap to substantially eliminate residual voltages induced in said other winding when said rotor is at rest.

7. A generator of the kind described having a stator with excited and output windings thereon, a rotor rotatable relative to said stator, and an element of magnetically permeable material closely associated with said stator and fixed relative thereto and positioned to reduce coupling between the windings when said rotor is at rest to substantially eliminate residual voltages induced in said output winding.

ISRAEL E. GOLDBERG.

References Cited in the file of this patent
UNITED STATES PATENTS

| Number | Name | Date |
|--------|------|------|
| 429,109 | Anderson | June 3, 1890 |
| 669,575 | Bliss | Mar. 12, 1901 |